United States Patent
Li

(10) Patent No.: US 8,224,040 B2
(45) Date of Patent: Jul. 17, 2012

(54) FACE RECOGNITION APPARATUS BASED ON EVEN LIGHT SOURCE

(75) Inventor: Weichao Li, Shenzhen (CN)

(73) Assignee: FIRS Intelligent Technology (Shenzhen) Co., Ltd., Shenzhen (CN)

( * ) Notice: Subject to any disclaimer, the term of this patent is extended or adjusted under 35 U.S.C. 154(b) by 909 days.

(21) Appl. No.: 12/274,362

(22) Filed: Nov. 20, 2008

(65) Prior Publication Data

US 2010/0039508 A1 Feb. 18, 2010

(30) Foreign Application Priority Data

Aug. 15, 2008 (CN) .......................... 2008 1 0142437

(51) Int. Cl.
*G06K 9/00* (2006.01)
(52) U.S. Cl. ........................ 382/118; 382/115; 348/77
(58) Field of Classification Search .................. 382/118, 382/181, 117, 115; 359/708, 359, 639; 600/476, 600/478; 362/241; 348/77
See application file for complete search history.

(56) References Cited

U.S. PATENT DOCUMENTS

| | | | |
|---|---|---|---|
| 2003/0053664 A1* | 3/2003 | Pavlidis et al. | 382/117 |
| 2004/0037462 A1* | 2/2004 | Lewis et al. | 382/181 |
| 2006/0104488 A1* | 5/2006 | Bazakos et al. | 382/118 |
| 2007/0035815 A1* | 2/2007 | Edgar et al. | 359/359 |
| 2007/0049832 A1* | 3/2007 | Edgar et al. | 600/476 |
| 2007/0285797 A1* | 12/2007 | Osetinsky | 359/639 |
| 2008/0312540 A1* | 12/2008 | Ntziachristos | 600/478 |
| 2009/0021934 A1* | 1/2009 | Chu | 362/241 |
| 2010/0157441 A1* | 6/2010 | Kweon | 359/708 |
| 2010/0189313 A1* | 7/2010 | Prokoski | 382/118 |

* cited by examiner

*Primary Examiner* — Le H Luu

(57) ABSTRACT

The present invention relates to a face recognition apparatus based on even light source, which includes a data processor (1), an imaging device (2) used to capture a face image and transport the face image to said data processor (1) for image processing, and an optical device (3) used to form an image of human face onto said imaging device (2). The optical device (3) further includes a camera lens (4) and an even light source device (5) located near or surrounding said camera lens (4). The even light source device (5) includes a light emitter (6) and an even light source generation device (7) which is used to generate indirect even light source by means of refraction, diffraction or reflection of light emitted by said light emitter (6). Light radiated onto the human face is evener due to the even light source, thus a better image effect is achieved to facilitate improving recognition quality and processing speed. Further, the apparatus may not bring irritation to human eyes, and may enhance comfortability during the recognition process.

9 Claims, 3 Drawing Sheets

FACE RECOGNITION APPARATUS BASED ON EVEN LIGHT SOURCE

FIELD OF INVENTION

Certain embodiments of the invention relate to identity recognition system. More specifically, certain embodiments relate to a face recognition system with even light source.

BACKGROUND OF THE INVENTION

As a kind of biometric identification technology, face recognition has been widely used in the field of identity recognition, e.g. entrance guard system, attendance system and monitoring system.

Light source which the existing technology adopts to carry out face recognition substantially includes infrared or visible light. Light emitted from such light sources is directly radiated onto the user's face and then in turn is reflected by the face into the infrared image sensor through an infrared lens. However, one problem with such face recognition system which utilizes direct light beam lies in the fact that light radiated onto the face is not even enough to enable a precise face recognition process due to the spot light source and direct radiation, and such light beam will make users feel uncomfortable during the recognition process because of the irritation it may bring to the user's eyes.

BRIEF SUMMARY OF THE INVENTION

The technical problem that the present invention serving to solve is that, according to the disadvantages of the existing face recognition system, e.g. uneven light source, poor image quality and irritation to human eyes, the present invention provides a face recognition system with even light source.

The technical solution that the present invention adopts to solve the above mentioned technical problem is to provide a face recognition apparatus based on even light source, comprising a data processor, an imaging device used to capture a face image and transport the face image to said data processor for image processing, and an optical device used to form an image of human face onto said imaging device; wherein said optical device further includes a camera lens and an even light source device located near or surrounding said camera lens; said even light source device comprises a light emitter and an even light source generation device which is used to generate indirect even light source by means of refraction, diffraction or reflection of light emitted by said light emitter.

Advantageously, said light emitter comprises an infrared light emitter or a blue light emitter or an ultraviolet light emitter.

Advantageously, said light emitter and said even light source generation device are located in a chamber, wherein said light emitter is mounted at any side of the chamber while said even light source generation device is configured as a bottom plate of said chamber; said even light source device further comprises an even light source panel which is capable of transmit light corresponding to the spectrum of light emitted from said light emitter.

Advantageously, said optical device includes a plurality of said even light source devices.

Advantageously, the apparatus further comprises a sensor used for ambient light detection and a control circuit connected with said sensor, which is used to initiate one or more of said even light source devices according to ambient light condition.

Advantageously, said camera lens comprises an ordinary camera lens and an optical filter located in front of said camera lens, which matches with the spectrum of light emitted from said light emitter; wherein said optical filter comprises a bandpass optical filter or a cut-off optical filter, having a bandpass width corresponding to the bandwidth of light emitted from said light emitter.

Advantageously, said camera lens comprises an ordinary camera lens and a filter coating plated on said camera lens, which matches the spectrum of light emitted from said light emitter; wherein said filter coating comprises a bandpass filter coating or a cut-off filter coating, have a bandpass width corresponding to the bandwidth of light emitted from said light emitter.

Advantageously, said even light source generation device comprises a specular reflection cavity, and said light emitter is mounted on a light emitting plate located at the bottom of said specular reflection cavity; wherein inner surface of said specular reflection cavity is made of metal materials which can enable specular reflection; said specular reflection cavity further comprises a main reflector to guide light emitted by said light emitting plate and light reflected by said specular reflection cavity into a direction to which said camera lens points.

Advantageously, said camera lens is mounted in the middle of said main reflector.

Advantageously, an additional optical filter is arranged at a light outlet of said specular reflection cavity; wherein said additional optical filter comprises a bandpass optical filter or a cut-off optical filter, having a bandpass width corresponding to the bandwidth of light emitted from said light emitter.

The beneficial effect of the face recognition apparatus based on even light source in accordance various embodiments of the present invention lies in that light radiated onto the human face may be evener due to the even light source utilized by apparatus, thus a better image effect is achieved to facilitate improving recognition quality and processing speed. Besides, the apparatus of the present invention may not bring irritation to human eyes, and may enhance comfortability during the recognition process.

DETAILED DESCRIPTION OF THE DRAWINGS

Figure 1:
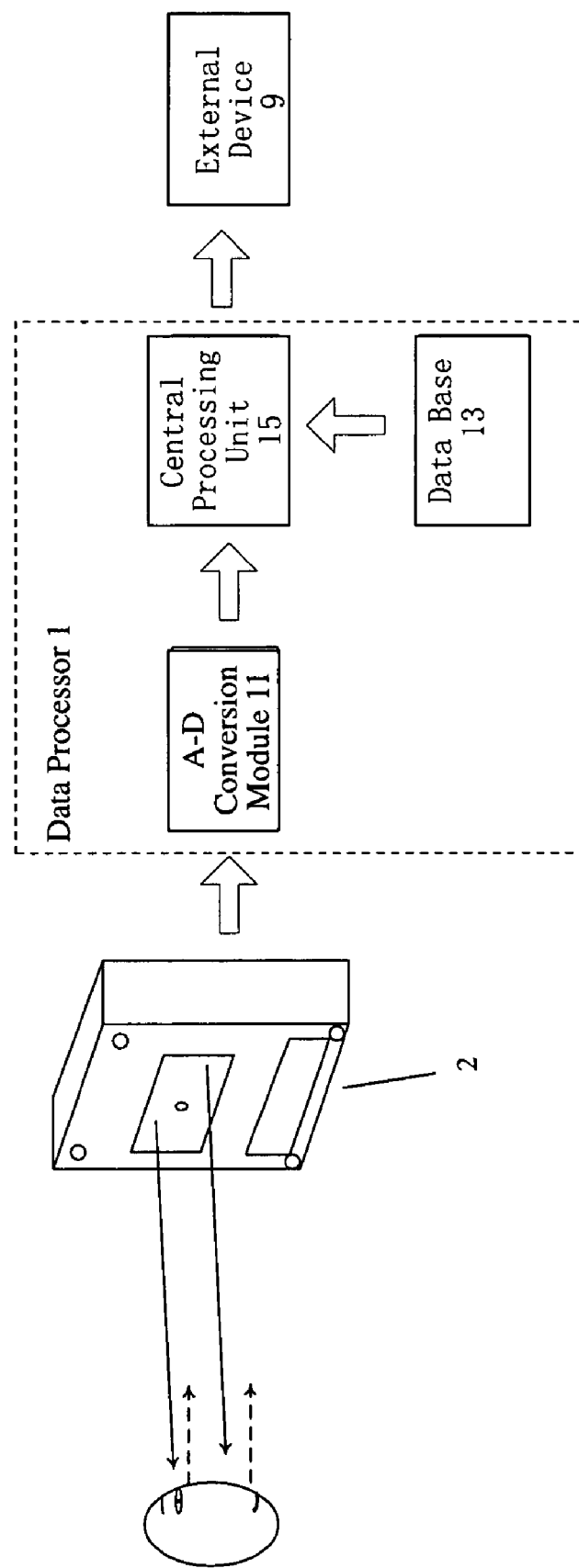
FIG. 1 is a general structural diagram of an exemplary face recognition apparatus based on even light source in accordance with an embodiment of the present invention.

Referring to FIG. 1, the exemplary face recognition apparatus in accordance with an embodiment of the present invention comprises an imaging device 2 and a data processor 1, wherein the data processor 1 further comprises an A-D conversion module 11, a central processing unit 15 and a database module 13. The imaging device 2 is used to capture a face image and transmit it to the data processor 1. Then the A-D conversion module 11 within said data processor 1 converts the analog image signals into digital signals and then transmits the digital signals to the central processing unit 15 for further processing. The database module 13 is used to store related image data which may be retrieved by the central processing unit 15. The central processing unit 15 may send a control signal to an external device 9 based on a processing result of the image data so as to control operation of the external device 9. For example, the external device 9 may be a switch device of an entrance guard system, a telling device of the ATM, a software interface or an alarm device, etc.

Figure 2:
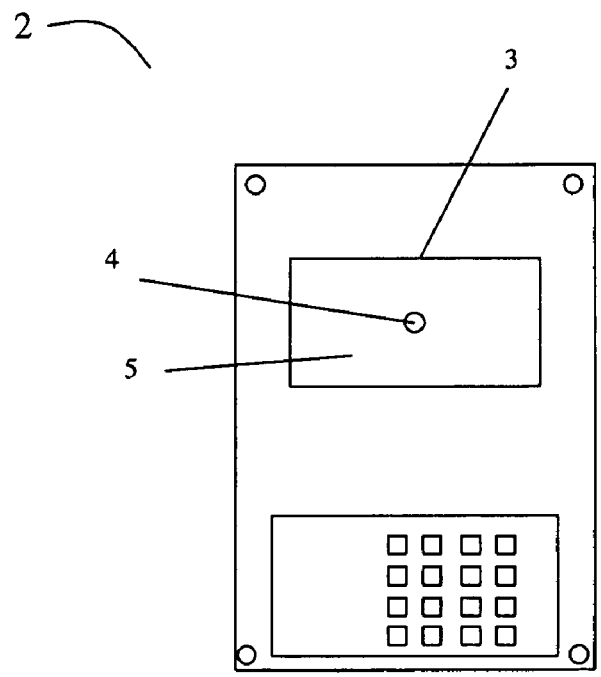
FIG. 2 is a general structural diagram of an exemplary imaging device of the face recognition apparatus in accordance with an embodiment of the present invention.

Referring to FIG. 2, in an embodiment of the present invention, the imaging device 2 comprises an optical system 3. The optical system 3 further comprises a camera lens 4 and an even light source device 5 which is located around the camera lens 4. In another embodiment of the present invention, the even light source device 5 may be located at any side of the camera lens 4 (not shown in the figure), e.g. at upper side, lower side, left side, right side, upper left side, upper right side, lower left side, lower right side depending on specific situations.

Figure 3:
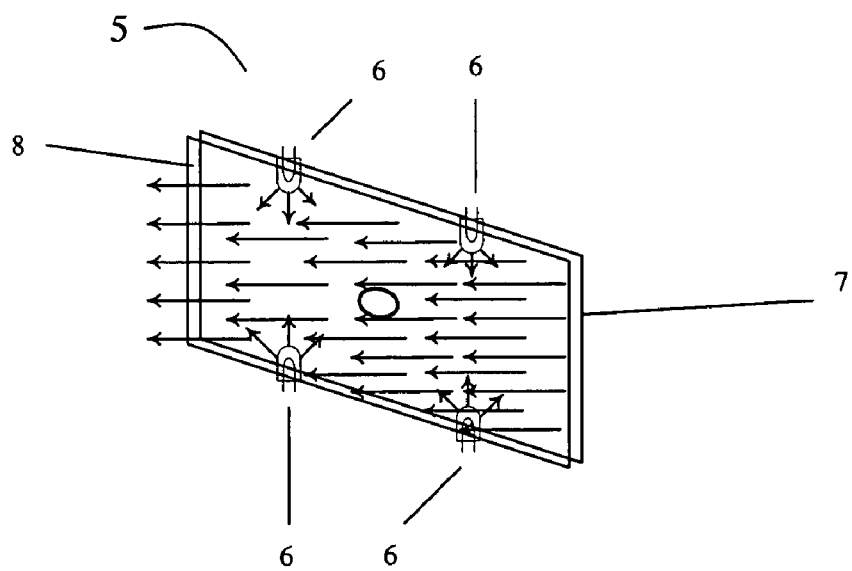
FIG. 3 is a general structural diagram of an exemplary even light source device of the face recognition apparatus in accordance with an embodiment of the present invention.

FIG. 3 is a general structural diagram of an exemplary even light source device of the face recognition apparatus in accordance with an embodiment of the present invention. Referring to FIG. 3, the even light source device 5 comprises a chamber consisted of a reflector 7 and an even light source panel 8. Additionally, a plurality of light emitters are located in the chamber. The reflector 7 and the even light source panel 8 are configured to enable light emitted from the light emitters 6 form an indirect even light source through reflection, infraction or diffraction i.e., forming diffuse scattering light. In addition, although there are four light emitters shown in FIG. 3, it is intended that the present invention not be limited to the arrangement described here, which means the position and quantity of the light emitters 6 may be changed according to the specific situations. There may be more or less light emitters which can be located at one side or both sides or four sides of said chamber.

Additionally, except the arrangement of integrating the camera lens 4 with the even light source device 5 as described in FIG. 2, a plurality of even light source devices 5 may be distributed around the camera lens 4. With respect to the control mechanism, it is conceivable to connect an ambient light sensor with a control circuit so that the control circuit can control one or more of the even light source devices 5 to emit light according to the sensed ambient light condition.

The light emitter 6 may be but not limited to infrared light emitter or blue light emitter or ultraviolet light emitter.

In an embodiment of the present invention, the light emitter 6 may be an infrared LED, preferably a scattering infrared LED.

In an embodiment of the present invention, said light emitter 6 may be a blue light LED, preferably a scattering blue light LED.

In an embodiment of the present invention, said light emitter 6 may be an ultraviolet light LED, preferably a scattering ultraviolet LED.

In an embodiment of the present invention, the reflector 7 may be a light reflection plate and the even light source panel 8 may be a transparent mask with its inner surface having fine diamond cracks, circular protruding points or spiracles. Said light reflection plate is made from materials with multiple diffuse reflection surfaces, which may enable diffuse reflection to light emitted from a spot light source. A multidirectional even light source may be generated from the spot light source reflected by the light reflection plate, and the generated even light source may be more even and gentle after passing through the transparent mask or a scattering film.

In an embodiment of the present invention, the even light source panel 8 is not a necessity, and the reflector 7 may be directly designed as a scattering screen, a soft light plate or a diffuse reflection light umbrella and so on.

Figure 4:
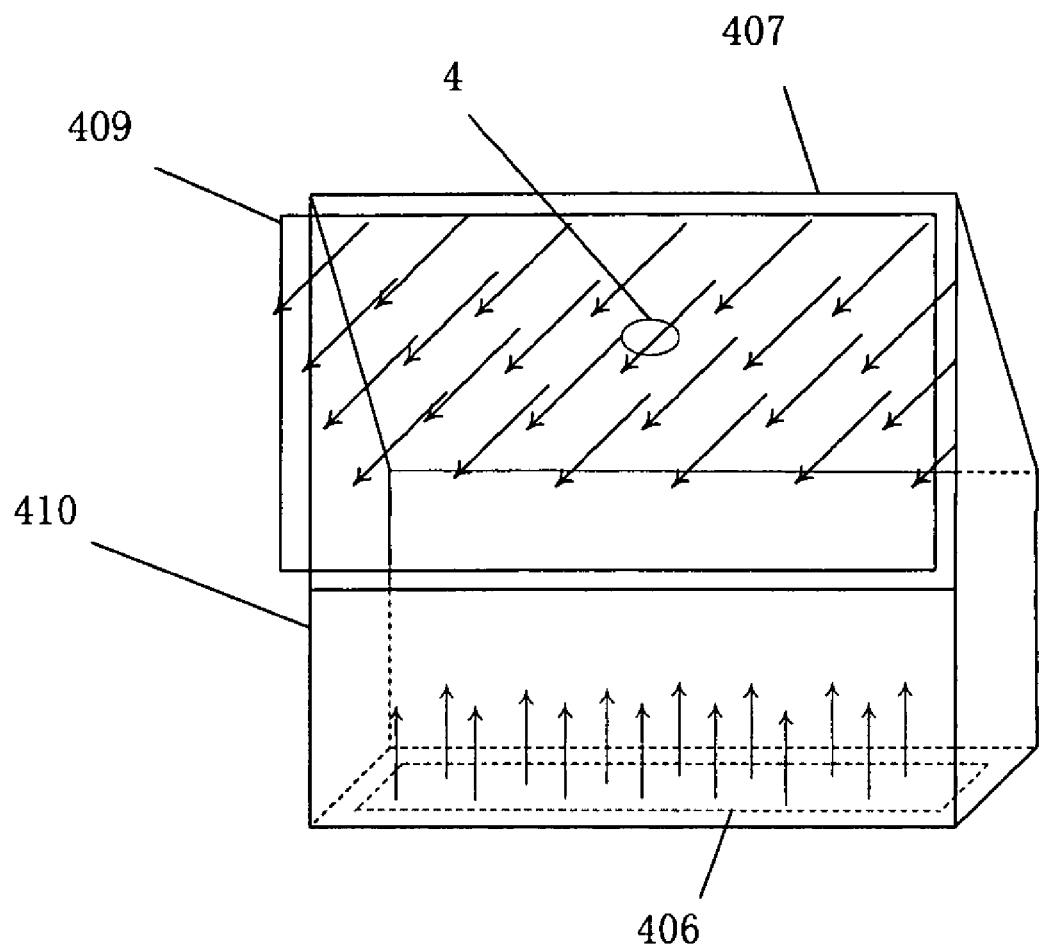
FIG. 4 is a general structural diagram of an exemplary even light source device of the face recognition apparatus in accordance with another embodiment of the present invention.

In the embodiment as shown in FIG. 4, the even light source device 400 comprises a specular reflection cavity 410, a light emitting plate 406 located at the bottom of the specular reflection cavity 410, a main reflector 407 located with a defined angle (e.g. 45°) between the upper portion of the specular reflection cavity 410 and the light emitting plate 406, and an optical filter located at the light outlet of the specular reflection cavity 410. The camera lens 4 is mounted in the middle of the main reflector 407. It should be noted that the position relationship between the main reflector 407 and the light emitting plate 406 is not limited to the case shown in FIG. 4. More specifically, it will be understood by those skilled in the art that any position relationship which can guide light emitted by the light emitter and light reflected by the specular reflection cavity 410 into the capture direction of the camera lens 4 may also be applicable.

A plurality of light emitters may be arranged on the light emitting plate 406. In operation, the light beams emitted from the light emitting plate 406 may be reflected by the specular reflection cavity 410 to generate an even light source. The inner surface of the specular reflection cavity 410 is made from materials which can enable mirror reflection. Light emitted from the light emitting plate 406 is firstly reflected by the multiple surfaces within the specular reflection cavity 410, and finally reflected by the main reflector 407 to generate an even light source. The even light source generated from the main reflector 407 may be utilized as a main light source for face recognition, and light reflected by the human face enters into the camera lens to finally form a face video signal.

In the present embodiment, said even light source may be light source with various colors, for example, infrared light, blue light, ultraviolet light, etc. Said optical filters may be corresponding to the color of the light source, and different light source may be generated by choosing different optical filters.

Alternatively, the optical filter 409 may be replaced by a filter coating plated on the camera lens, and the light outlet may be equipped with a transparent mask or a scattering film as described above.

Alternatively, the camera lens 4 may be an ordinary camera lens with a piece of infrared optical filter mounted in front of said lens. For example, the infrared optical filter may be a band pass filter or a cut-off filter which can filter out visible light and allow infrared light to get through, wherein the band pass width of the optical filter may correspond to that of the infrared light emitted from the light emitters 6. Alternatively, the camera lens 4 may also be an ordinary camera lens with a piece of infrared filter coating plated on said lens, wherein the infrared filter coating may filter out visible light and allow infrared light to get through, and the band pass width of the filter coating may correspond to that of the infrared light emitted from the light emitters 6.

Alternatively, the camera lens 4 may be an ordinary camera lens with a piece of blue light optical filter mounted in front of said lens. For example, said blue light optical filter may be a band pass filter or a cut-off filter which may allow blue light to get through while filter out other visible light with different wavelength, wherein the band pass width of the optical filter may correspond to that of the blue light emitted from said light emitters 6. Alternatively, the camera lens 4 may also be an ordinary camera lens with a piece of blue light filter coating plated on said lens, wherein said blue light filter coating may allow blue light to get through while filter out other visible light with different wavelength, and the band pass width of the filter coating may correspond to that of the blue light emitted from said light emitters 6.

Alternatively, the camera lens 4 may be an ordinary camera lens with a piece of ultraviolet optical filter mounted in front of said lens. For example, the ultraviolet optical filter may be a band pass filter or a cut-off filter which may allow ultraviolet light to get through while filter out other visible light with different wavelength, wherein the band pass width of the optical filter may correspond to that of the ultraviolet light emitted from said light emitters 6. Alternatively, the camera lens 4 may also be an ordinary camera lens with a piece of ultraviolet light filter coating plated on said lens, wherein the ultraviolet light filter coating may allow ultraviolet light to get through while filter out other visible light with different wavelength, and the band pass width of the filter coating may correspond to that of the ultraviolet light emitted from said light emitters 6.

I claim:

1. A face recognition apparatus based on even light source, comprising a data processor (1), an imaging device (2) used to capture a face image and transport the face image to said data processor (1) for image processing, and an optical device (3) used to form an image of human face onto said imaging device (2); wherein said optical device (3) comprises a camera lens (4) and an even light source device (5) located near or surrounding said camera lens (4); said even light source device (5) comprises a light emitter (6) and an even light source generation device (7) which is used to generate indirect even light source by means of refraction, diffraction or reflection of light emitted by said light emitter (6); wherein said even light source generation device (7) comprises a specular reflection cavity (410), and said light emitter (6) is mounted on a light emitting plate (406) located at the bottom of said specular reflection cavity (410); wherein inner surface of said specular reflection cavity (410) is made of metal materials which can enable specular reflection; said specular reflection cavity (410) further comprises a main reflector (407) to guide light emitted by said light emitting plate (406) and light reflected by said specular reflection cavity (410) into a direction to which said camera lens (4) points.

2. The apparatus according to claim 1, wherein said light emitter (6) comprises an infrared light emitter or a blue light emitter or an ultraviolet light emitter.

3. The apparatus according to claim 2, wherein said light emitter (6) and said even light source generation device (7) are located in a chamber, wherein said light emitter (6) is mounted at any side of the chamber while said even light source generation device (7) is configured as a bottom plate of said chamber; said even light source device (5) further comprises an even light source panel (8) which is capable of transmit light corresponding to the spectrum of light emitted from said light emitter (6).

4. The apparatus according to claim 1, wherein said optical device includes a plurality of said even light source devices (5).

5. The apparatus according to claim 4, wherein the apparatus further comprises a sensor used for ambient light detection and a control circuit connected with said sensor, which is used to initiate one or more of said even light source devices (5) according to ambient light condition.

6. The apparatus according to claim 1, wherein said camera lens (4) comprises an ordinary camera lens and an optical filter located in front of said camera lens, which matches the spectrum of light emitted from said light emitter (6); said optical filter comprises a bandpass optical filter or a cut-off optical filter, having a bandpass width corresponding to the bandwidth of light emitted from said light emitter (6).

7. The apparatus according to claim 1, wherein said camera lens (4) comprises an ordinary camera lens and a filter coating plated on said camera lens, which matches with the spectrum of light emitted from said light emitter (6); said filter coating comprises a bandpass filter coating or a cut-off filter coating, having a bandpass width corresponding to the bandwidth of light emitted from said light emitter (6).

8. The apparatus according to claim 1, wherein said camera lens (4) is mounted in the middle of said main reflector (407).

9. The apparatus according to claim 8, wherein an additional optical filter is arranged at a light outlet of said specular reflection cavity (410); wherein said additional optical filter comprises a bandpass optical filter or a cut-off optical filter, having a bandpass width corresponding to the bandwidth of light emitted from said light emitter (6).

* * * * *